Oct. 11, 1927.
A. E. WINCKLER
1,644,805
CONTROLLER PEDAL FOR TRANSMISSIONS
Original Filed Aug. 13, 1925
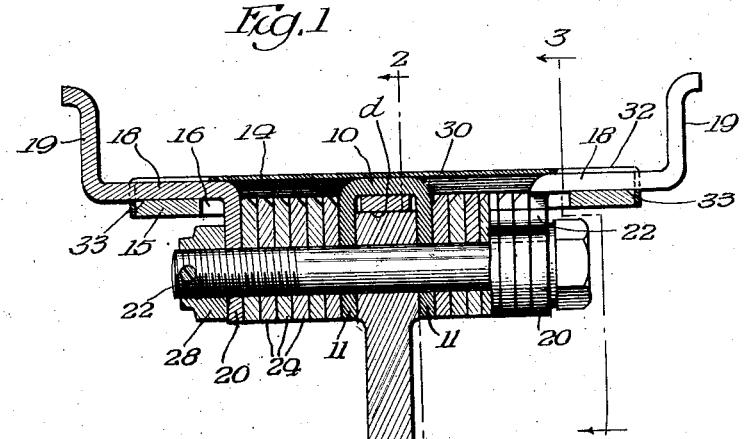
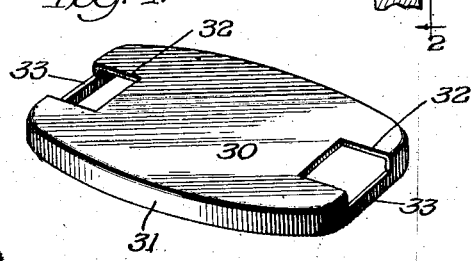
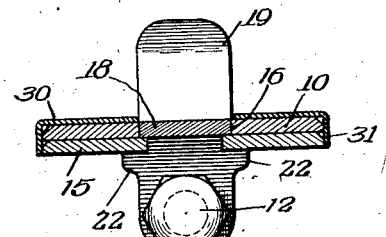
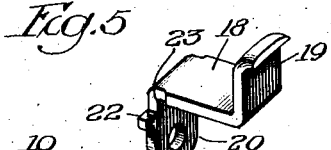
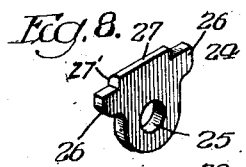
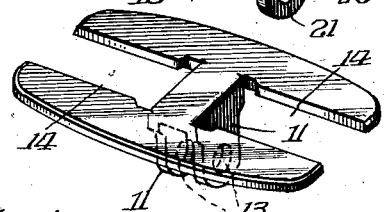
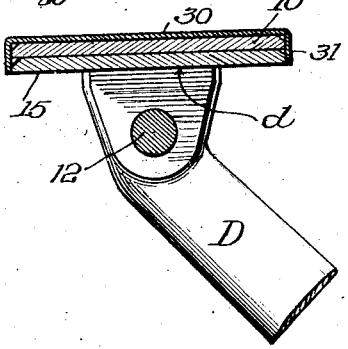
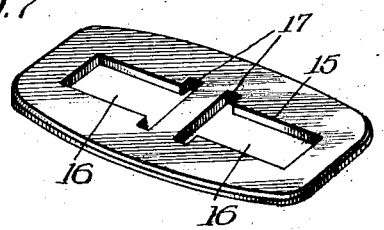
Inventor
Aage E. Winckler
By Fred Gerlach.
his Atty.

Patented Oct. 11, 1927.

1,644,805

UNITED STATES PATENT OFFICE.

AAGE E. WINCKLER, OF MILWAUKEE, WISCONSIN.

CONTROLLER PEDAL FOR TRANSMISSIONS.

Application filed August 13, 1925, Serial No. 49,923. Renewed August 17, 1927.

The invention relates to pedals designed more particularly for controlling variable speed and reverse transmission gearing.

One object of the invention is to provide an improved foot-piece for a pedal which may be produced essentially of sheet metal parts which may be readily assembled so that it may be produced at a low cost.

Another object is to provide an improved footpiece which is adjustable in width so that it may be fitted to the sides of the shoe of the operator to more effectively control lateral movements of the pedal, desired more particularly in devices in which a single-pedal is used to control the variable speed and reverse transmission gearing.

Other objects will appear from the detail description.

The invention consists in the several novel features hereinafter set forth and more particularly defined by claims at the conclusion hereof.

In the drawings: Fig. 1 is a transverse section of a pedal embodying the invention. Fig. 2 is a section taken on line 2—2 of Fig. 1. Fig. 3 is a section taken on line 3—3 of Fig. 1. Fig. 4 is a perspective of the sheet metal cover-plate. Fig. 5 is a detail perspective of one of the adjustable side-lugs. Fig. 6 is a perspective of the upper plate. Fig. 7 is a perspective of the bottom-plate. Fig. 8 is a perspective view of a spacer plate.

The invention is exemplified as applied to a foot-operable lever D, the lower end of which is usually pivoted so that the upper end is universally movable and operable by the foot-piece. The latter comprises a top-plate 10, which is shaped of a flat plate of sheet metal cut and bent to form downturned integral ears 11 which are adapted to straddle the upper end of the lever D and to be connected thereto by a bolt 12 which passes through the lever and through aligned holes 13 in said ears. The downturned ears, cut from the plate, leave transverse slots 14 which extend to the sides of the plate 10. A bottom-plate 15, also formed of sheet metal, has its margin shaped to conform to the margin of the plate 10, and is formed with a pair of slots 16, the inner ends of which are notched, as at 17, so that the ears 11 may be extended therethrough in assembling the foot-piece, and so the bottom plate will be held and positioned over the top-plate and against longitudinal or lateral displacement. The outer ends of slots 16 are closed.

Adjustable side-lugs, also formed of sheet metal, are provided for the foot-piece. Each lug comprises a horizontally extending portion 18 which is slidably fitted in one of the slots 14 and rests on the side-portions of the bottom-plate 15, an upturned integral lip or guard 19, adapted to engage one side of the operator's shoe or foot, a downturned ear 20, provided with a hole 21, through which the bolt 12 passes, and shoulders 22 to extend under the underside of bottom-plate 15. These lugs are also notched, as at 23, to receive the margins of slot 14 in plate 10, so their horizontal portions 18 overlie and rest on the margins of slots 16 in the bottom-plate.

Spacer-plates 24 are provided to variably space the ears 20 of the side-lugs from the ears 11 on the plate 10, to correspondingly adjust the lugs and so they will be securely held when the bolt 12 is tightened. Each spacer is provided with a hole 25, through which the bolt 12 extends, shoulders 26 to extend under the bottom-plate 15, and an extension 27, fitting into the slot 16 of plate 15. Nut 28 on bolt 12 is adapted to clamp the ears on the side-lugs, spacers, ears 11 on the intermediate plate 10 together, and to hold the bolt in the lever D.

A sheet metal cover-plate 30, which is usually utilized to display the name of the manufacturing concern, fits over the top face of plate 10 and the portions 18 of the side lugs to hold the lugs on the bottom plate 15, and is provided with a downturned marginal flange 31 fitting around and enclosing the edges of plates 10 and 15. This plate 30 is also provided with slots 32 to permit the lips or guards 19 to be adjusted inwardly or outwardly. The flange 31 extends, as at 33, around the outer ends of these slots 32 to underlie the portions 18 of the side-lugs so they will hold the cover-plate in connected relation with plate 15, the top-plate 10 being confined between the cover and plate 15.

By shifting more or less of the spacers 24 to the outside of the ears 20 of either or both of the side-lugs, the distance between them may be varied, so that the shoe or foot of the individual operator will fit snugly between the guards 19. If desired, either of the side lugs may be adjusted inwardly or outwardly by corresponding placement of the spaces 24, so that the center of the shoe may be at either side of the center of the pedal. The bolt 12 and nut 28 are adapted to clamp the ears on the side-lugs and the plate 10 and the spacers securely together, to fixedly hold the foot-piece on the pedal. By removing nut 28 and withdrawing the bolt 12, the foot-piece may be disconnected from the lever D. The extensions 27 on the spacers, are tapered as at 27', to facilitate their insertion into place. Lever D may be provided with an abutment $d$ to fit against the underside of plate 15 to properly angle the foot piece relatively to the lever.

When the bolt has thus been withdrawn from the foot-piece, the shoulders 22 and margins of portions 18 of the side-lugs, between which the plate 15 is confined, will hold the bottom plate and side-lugs in connected relation. The flange-portions 33 of the cover plate underlie the lug-portions 18, so that the cover-plate will be held in connected relation to the side-lugs and the bottom-plate, and the top-plate will be confined between the bottom-plate 15 and the cover-plate. As a result of this construction, the several members of the foot-piece will be conveniently held in assembled relation while the spacers are being transposed, to effect adjustment of the side-lugs. A characteristic, resulting from the use of spacers between the ears on a plate of the foot-piece and the side-lugs, is that the latter will be firmly clamped in their assigned position.

The invention exemplifies an adjustable foot-piece for a lever which is composed essentially of sheet metal parts, and which can be readily assembled, so that the foot-piece may be produced at a low cost. The invention also exemplifies an improved foot-piece, in which adjustment of the side-lugs is effected by transposition of spacers which permit a single bolt to securely clamp the several parts together in their assigned and connected relation. It also exemplifies a foot-piece composed of sheet metal parts which will be held together in connected relation while the spacers are being transposed, and in which the spacers are clamped in place by the bolt which secures the side-lugs and one of the plates together.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In a pedal, the combination with a lever, of a foot-piece for the lever comprising a top-plate provided with a downturned perforated ear, side-lugs provided with perforated ears, a bottom-plate fitting the underside of the top-plate and provided with slots through which the lugs are extended, a bolt extending through ears on the lugs and the top-plate to secure them together, and means to hold the bottom-plate against the top-plate.

2. In a pedal, the combination with a lever, of a foot-piece for the lever comprising a top-plate provided with slots and a downturned perforated ear, side lugs having portions in said slots and provided with perforated ears, a bottom-plate fitting the underside of the top plate and provided with slots through which the lugs are extended, a bolt extending through the ears on the lugs and the top-plate to secure them together, and shoulders on the lugs under the bottom plate.

3. In a pedal, the combination with a lever, of a foot-piece for the lever comprising a top-plate provided with downturned perforated ears, side lugs guided in the top-plate and provided with perforated ears, a bottom-plate fitting the underside of the top-plate and provided with slots through which the lugs are extended, spacers between the ears on the top-plate and the lugs, a bolt extending through the ears and the lugs to secure them together.

4. In a pedal, the combination with a lever, of a foot-piece for the lever comprising a top-plate provided with downturned perforated ears, side-lugs guided in the top-plate and provided with perforated ears, a bottom-plate fitting the underside of the top plate and provided with slots through which the lugs are extended, spacers between the ears on the top-plate and the lugs, a bolt extending through the ears and the lugs to secure them together, the lugs and spacers being provided with shoulders under the bottom plate.

5. In a pedal, the combination with a lever, of a foot-piece for the lever comprising a guide-plate provided with a downturned perforated ear, side-lugs, one of which is adjustable sidewise in said guide-plate and provided with an ear extending through the guide-plate, means to variably position the adjustable lug, a slotted bottom-plate fitting the underside of the guide-plate, means to hold the bottom-plate in position, and a bolt extending through the ears to secure the plates and adjustable lug together.

6. In a pedal, the combination with a lever, of a foot-piece for the lever comprising a guide-plate provided with downturned perforated ears, side-lugs, one of which is adjustable sidewise in said guide-plate and provided with an ear, means to variably position the adjustable lug, a slotted bottom-plate fitting the underside of the guide-plate, shoulders on the adjustable lug under the bottom-plate, and a bolt extending through the ears to secure the plates and lug together.

7. In a pedal, the combination with a lever, of a foot-piece for the lever comprising a guide-plate provided with downturned perforated ears, side-lugs, one of which is adjustable sidewise in said guide-plate and provided with an ear, spacers between the ears on the adjustable lug and an ear on the guide-plate, to variably position the adjustable lug, a bottom-plate fitting the underside of the guide-plate, shoulders on the adjustable lug and spacers under the bottom-plate and a bolt extending through the ears and spacers to secure them together.

8. In a pedal, the combination with a lever, of a foot-piece for the lever comprising a top-plate provided with a perforated ear and with slots, side lugs held in said slots and provided with perforated ears, a bottom plate having slots therein through which the side lugs are extended, means for holding the bottom-plate against the top-plate, a bolt for securing the lugs and top-plate together and a cover plate extending over and held on the top-plate.

9. In a pedal, the combination with a lever of a foot-piece for the lever comprising a top-plate provided with a perforated ear and with slots, side lugs held in said slots and provided with perforated ears, a bottom plate having slots therein through which the side lugs are extended, means for holding the bottom-plate against the top-plate, a bolt for securing the lugs and top-plate together, and a cover-plate extending over the top-plate, provided with slots through which the lugs extend and held on the top plate by the side-lugs.

10. In a pedal, the combination with a lever of a foot-piece for the lever comprising a top-plate provided with a perforated ear and with slots, side lugs held in said slots and provided with perforated ears, a bottom plate having slots therein through which the side-lugs are extended, spacers for the ears on the lugs, means for holding the bottom plate against the top-plate, a bolt for securing the lugs, spacers and top-plate together, and a cover-plate extending over and held on the top plate.

11. In a pedal, the combination with a lever, of a foot-piece for the lever comprising a plate, laterally adjustable side lugs, removable spacers to variably position the side lugs relatively to the plate, and a bolt for securing the plate, lugs and spacers together.

12. In a pedal, the combination with a lever, of a foot-piece comprising a plate, laterally adjustable side lugs, removable spacers to variably position the side lugs relatively to the plate, and a bolt extending through the plate, lugs and spacers to secure them together.

13. In a pedal, the combination with a lever of a foot-piece comprising a plate formed of sheet metal and provided with slots and downturned perforated ears, side-lugs adjustable sidewise in the slots and provided with perforated ears, means to variably position the lugs, and a bolt extending through the ears on the plate and lugs to secure them together.

14. In a pedal, the combination with a lever of a foot-piece comprising a plate formed of sheet metal and provided with slots and downturned perforated ears, side-lugs adjustable sidewise in the slots and provided with perforated ears, removable spacers to variably position the lugs, and a bolt extending through the ears on the plate and lugs and the spacers to secure them together.

15. In a pedal, the combination with a lever, of a foot-piece for the lever comprising a plate provided with a perforated ear, side lugs at least one of which is laterally adjustable, a perforated ear on the adjustable lug, removable spacers between the ears to variably position the adjustable lug, a bolt extending through the ears, to secure the plate and lugs together with the spacers therebetween.

16. The combination with a lever, of a foot-piece for the lever, comprising a guide-plate provided with downturned perforated ears, side-lugs, one of which is adjustable sidewise in the plate and provided with an ear, means to variably position the adjustable lug, a bottom-plate fitting the underside of the guide-plate, means to hold the bottom-plate in position, and a bolt extending through the adjustable lug and ears to secure the guide-plate and lug together.

17. The combination with a lever, of a foot-piece for the lever comprising a guide-plate provided with downturned perforated ears, side-lugs, one of which is adjustable sidewise in the plate and provided with an ear, removable spacers to variably position the adjustable lug, a bottom plate fitting the underside of the guide-plate, shoulders on the lug under the bottom-plate, and a bolt extending through the adjustable lug and ears and the spacers to secure them together.

18. In a pedal, the combination with a lever, of a foot-piece comprising a top plate having slots therein and provided with a pivoted ear, side-lugs slidable in the slots of said top-plate, a bottom-plate, means for securing the bottom plate against the underside of the top plate, a bolt for securing the side lugs and the top-plate together, and a cover-plate extending over and held in the top-plate and provided with slots for the side-lugs.

19. In a pedal, the combination with a lever, of a foot-piece comprising a top-plate having slots therein and provided with a pivoted ear, side-lugs slidable in the slots of said top-plate, a bottom-plate, means for securing the bottom-plate against the underside of the top-plate, a bolt for securing the side-lugs and the top-plate together, and a cover-plate extending over and held in the top-plate and provided with slots for the side-lugs and with a marginal flange extending around the margins of the top and bottom plates.

20. In a pedal, the combination with a lever, of a foot-piece for the lever comprising a top-plate formed of sheet metal and provided with integral downturned ears to straddle the pedal, a bottom-plate fitting under the top-plate and provided with slots through which the ears are extended, side-lugs in the top-plate and extending through the slots in the bottom-plate, and provided with ears, spacers between the ears on the top and side-lugs to position the side lugs, and a bolt extending through the ears on the side-lugs and the top-plate.

21. In a pedal, the combination with a lever, of a foot-piece for the lever comprising a top-plate formed of sheet metal and provided with integral downturned ears to straddle the pedal, a bottom-plate fitting under the top-plate and provided with slots through which the ears are extended, side-lugs in the top-plate and extending through the slots in the bottom plate, and provided with ears, spacers between the ears on the top and side lugs to position the side lugs, a cover-plate over the top-plate and held thereon by the lugs, and a bolt extending through the ears on the side lugs and the top-plate.

22. In a pedal, the combination with a lever, of a foot-piece for the lever comprising a top-plate formed of sheet metal and provided with integral downturned ears to straddle the pedal, a bottom-plate fitting under the top-plate and provided with slots through which the ears are extended, side-lugs adjustable sidewise in the top-plate, and extending through the slots in the bottom-plate, and provided with ears, removable spacers between the ears on the top and side-lugs to variably position the side-lugs, and a bolt extending through the ears on the side-lugs and the top plate and through the spacers and the lever to secure them together.

23. In a pedal, the combination with a lever, of a foot-piece for the lever comprising a top-plate formed of sheet metal and provided with integral downturned ears to straddle the pedal, a bottom-plate fitting under the top-plate and provided with slots through which the ears are extended, side-lugs adjustable sidewise in the top-plate and extending through the slots in the bottom plate, and provided with ears, removable spacers between the ears on the top and the side-lugs to variably position the side lugs, and a bolt extending through the ears on the side lugs and the top plate and through the spacers and the lever to secure them together, the lugs and spacers being provided with shoulders under the bottom-plate.

24. In a pedal, the combination with a lever, of a foot-piece for the lever comprising a plurality of superposed plates, side-lugs, the plates and lugs being provided with integral interfitting parts to retain them together, and clamping means for holding the lugs and one of the plates together.

25. In a pedal, the combination with a lever, of a foot-piece for the lever comprising a plurality of superposed plates, one of which is provided with integral ears extending through the other and with transverse slots, side-lugs having portions held in said slots and provided with ears transversely aligned with the ears on one plate and extending through the other plate, spacing means between the ears, and a bolt for clamping the ears and spacers together.

26. In a pedal, the combination with a lever, of a foot-piece for the lever comprising a plurality of superposed plates, side-lugs, the plates and lugs being provided with integral interfitting parts to retain them together, clamping means for holding the lugs and one of the plates together, and a cover-plate held by the side-lugs.

Signed at Chicago, Illinois, this 23rd day of July, 1925.

AAGE E. WINCKLER.